United States Patent
Christie, IV et al.

(10) Patent No.: US 6,549,621 B1
(45) Date of Patent: Apr. 15, 2003

(54) METHOD AND SYSTEM FOR INTEGRATING A COMPUTER AND A TELEPHONE

(75) Inventors: Samuel H. Christie, IV, Cary, NC (US); Patrick J. Dagert, Raleigh, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/361,099

(22) Filed: Jul. 26, 1999

(51) Int. Cl.[7] .......................... H04M 7/00; H04L 12/28
(52) U.S. Cl. ........................................ 379/230; 370/389
(58) Field of Search ................................. 379/199, 219, 379/220.01, 229, 230; 370/352, 355, 395.5, 389

(56) References Cited

U.S. PATENT DOCUMENTS 5,712,906 A * 1/1998 Grady et al. .............. 379/93.25
6,081,591 A * 6/2000 Skoog ........................ 379/230
6,370,137 B1 * 4/2002 Lund ........................... 370/352
6,430,176 B1 * 8/2002 Christie, IV ................ 370/355

\* cited by examiner

*Primary Examiner*—Benny Q. Tieu
(74) *Attorney, Agent, or Firm*—Nortel Networks Limited; John R. Witcher, III

(57) ABSTRACT

A method and system for integrating a computer and a telephone. A stimulus messaging device, such as an analog telephone, is provisioned as a functional messaging device, such as an ISDN telephone, at a switch. The switch communicates with the telephone through a loop interface device. The loop interface device translates ISDN messages destined for the telephone received from the switch into analog signals for the telephone. The loop interface device also sends the ISDN messages received from the switch to a computer associated with the telephone. The loop interface device translates analog signals received from the telephone into ISDN messages for transmission to either the switch and/or the computer. The present invention enhances call control information for an analog telephone and allows tight integration between a telephone and a computer.

21 Claims, 4 Drawing Sheets

US 6,549,621 B1

METHOD AND SYSTEM FOR INTEGRATING A COMPUTER AND A TELEPHONE

FIELD OF THE INVENTION

This invention relates generally to integrating computers and telephones, and in particular to enhancing the call control information associated with a phone for the purpose of such integration.

BACKGROUND OF THE INVENTION

Many individuals have a telephone and a computer on their office desktops today. Efforts have been made to functionally integrate the two devices to leverage the strengths of each. One such effort has been through the use of computer telephony integration (CTI). CTI allows a computer and a telephone switch to exchange telephone call control information. One benefit of CTI is to allow call control to move from a telephone set to the personal computer screen, mouse, and keyboard. This not only offers users more flexible call functions and status information, it also enables the telephone to become a logical extension of desktop applications and functions for intelligent, personalized call and voice message management. However, CTI is frequently available only to large entities that are in a position to negotiate a large contract with a telephone company, or purchase its own private branch exchange (PBX). Even in those relatively rare instances where CTI is more widely available, administrative and capacity issues frequently prevent companies from being able to deploy CTI.

Telephone sets communicate using either digital or analog signaling. One type of digital telephone technology is Integrated Services Digital Network (ISDN). ISDN technology features a robust call control message set, referred to as Q.931 messages, that can be used by an ISDN modem or telephone. One advantage to using digital signaling, such as Q.931 messaging, is the increased information available during the call setup process. Unfortunately, ISDN has not been widely successful in the United States due to cost and other factors, and consequently the majority of telephones currently in existence are analog telephones. In contrast to an ISDN telephone, only limited call control functionality is associated with an analog telephone. The limited call control information associated with an analog telephone limits the ability to integrate a computer and a telephone.

Given the large number of individuals that have an analog telephone and computer on their desktop, it would be desirable if a method and system were available to enhance the call control information associated with an analog telephone. Such enhanced call control information would allow tighter integration between the telephone and computer than is currently feasible.

SUMMARY OF THE INVENTION

In accordance with the purposes of the present invention, a method and system for communicating a call control message between a loop interface device and a computer is provided. An analog telephone is provisioned at a switch as an ISDN telephone. Communications between the telephone and the switch are processed through a loop interface device. The loop interface device receives a first ISDN message transmitted by the switch to the telephone. The loop interface device forwards notification of the first ISDN message to a computer associated with the telephone. In response to the first ISDN message, the computer can generate and send to the loop interface device a second ISDN message. The loop interface device receives the second ISDN message and sends it to the switch. The second ISDN message could be, for example, a CONNECT message for establishing communications between the calling and called parties.

According to the present invention, a loop interface device translates ISDN messages received from a switch into the appropriate analog signals for an analog telephone, and maps the ISDN D-channel messages into a suitable format for transmission to a computer associated with the telephone. The loop interface device also receives analog signals from the analog telephone and converts the analog signals into appropriate ISDN messages for transmission to the switch. The loop interface device also maps messages received from the computer into D-channel messages for transmission to the switch.

According to another aspect of the present invention, a method for communicating a call control message between a loop interface device and a computer is provided by indicating to a switch associated with a stimulus messaging device that the stimulus messaging device communicates via a functional messaging protocol, communications between the stimulus messaging device and the switch being processed through the loop interface device. The loop interface device receives a first functional message transmitted by the switch, the first functional message being associated with the stimulus messaging device. Notification of the first functional message is sent to a computer associated with the stimulus messaging device. The computer can utilize the information in the notification to cause processing to occur on the computer, and can respond to the loop interface device with an appropriate call control message, if desired.

Still other advantages of the present invention will become apparent to those skilled in the art from the following description wherein there is shown and described preferred embodiments of this invention. As will be realized, the invention is capable of other different aspects, all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principals of the present invention.

Reference will now be made in detail to present preferred embodiments of the present invention, examples of which are illustrated in the accompanying drawings, wherein like numerals indicate the same elements throughout the views.

DETAILED DESCRIPTION

Figure 1:
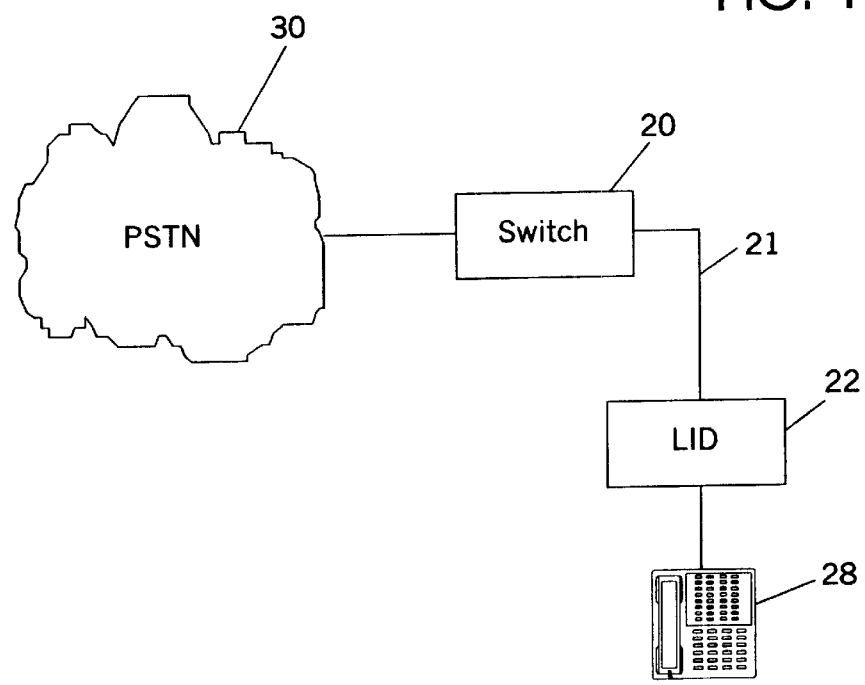
FIG. 1 is a block diagram illustrating components in a conventional telephone network.

Many desktops today, in both large office environments and small office/home office environments, include a computer and an analog telephone. Many of the these environments do not have access to conventional computer telephony integration (CTI) which can allow functional coupling or integration of the telephone and computer. CTI may not be available because the environment is not large enough to warrant its own telephone switch, because the local access provider does not offer the service, or for numerous other reasons.

A significant percentage of analog telephones are serviced through loop interface devices such as digital loop carriers. Such loop interface devices (LIDs) act as a line concentrator for a Central Office (CO) by multiplexing individual subscriber lines serviced by the LID over a single line to the CO. LIDs are widely used in providing telephone service because of the efficiencies they provide in servicing remote users and high concentrations of users. Because a LID communicates with subscriber equipment in the same manner as does a CO, a telephone is unaware it is coupled to a LID rather than a CO.

A LID communicates with the CO using a predetermined protocol, such as that defined in Bellcore's GR-303 specification. Where the subscriber equipment is an ISDN telephone, the call control information generated at the switch, such as ISDN Q.931 messages, are communicated to the LID, and similarly, the LID sends Q.931 messages generated by the ISDN telephone to the CO. Q.931 messages are described in detail in the ITU-T Recommendation Q.931, dated March, 1993, which is hereby incorporated by reference herein.

For the sake of illustration, the invention will be discussed herein with reference to provisioning an analog plain old telephone service (POTS) phone as an ISDN phone to thereby enhance the call control information associated with the analog phone. However, the invention herein has applicability to devices other than a POTS phone and to messaging other than ISDN messaging. Generally, there are two types of call control messaging, which will be referred to herein as stimulus messaging and functional messaging, respectively. Stimulus messaging operates through detection of certain stimuli, such as off-hook and on-hook events, which imply call setup events. A POTS phone is an example of a stimulus messaging device. Media Gateway Control Protocol (MGCP), H.248 and H.245 are examples of stimulus protocols for use with stimulus messaging devices. Functional messaging operates through the transmission of digital messages that comprise call control transactions. Examples of functional messaging protocols are ISDN, H.323, and Session Initiation Protocol (SIP). Thus, one aspect of the present invention can also be described as enhancing the call control information associated with a stimulus messaging device.

Another aspect of the present invention relates to communicating a call control message between a LID and a computer. As described herein, the enhanced call control messaging associated with the stimulus messaging device can be communicated between a LID and a computer to aid in integrating the computer and the stimulus messaging device, such as an analog phone.

FIG. 1 illustrates a conventional telephone network. A stimulus messaging device, such as analog telephone 28, is coupled to a loop interface device (LID) 22 through a traditional local loop medium such as copper wire. As used herein the phrase loop interface device is used to refer to telecommunications equipment that serve to convert traffic from one format to another. For example, a LID can comprise a digital loop carrier that converts analog traffic to GR-303 traffic. Another example of a LID is a media gateway that converts analog traffic to IP traffic.

A call is placed to analog telephone 28 from the public switched telephone network (PSTN) 30. During call setup certain information associated with the call is received by switch 20. Switch 20 sends this information over multiplexed line 21 to LID 22, which in turn sends the information to telephone 28, causing telephone 28 to ring. When a user picks up the handset associated with telephone 28, LID 22 passes the off-hook signal to switch 20, which then completes the connection with the calling party. Similarly, when a call is placed using telephone 28, LID 22 sends the off-hook condition to switch 20, which in response sends a dial tone signal to telephone 28 via LID 22. LID 22 sends the DTMF tones generated by the keypad of telephone 28 to switch 20. Switch 20 uses the DTMF tones to determine how to direct the call over the PSTN.

If telephone 28 were a functional messaging device, such as an ISDN telephone instead of an analog telephone, LID 22 would behave similarly, except LID 22 would receive from switch 20 ISDN Q.931 call control messages that would be sent to telephone 28. Similarly, LID 22 would send to switch 20 any Q.931 messages generated by telephone 28.

Figure 2:
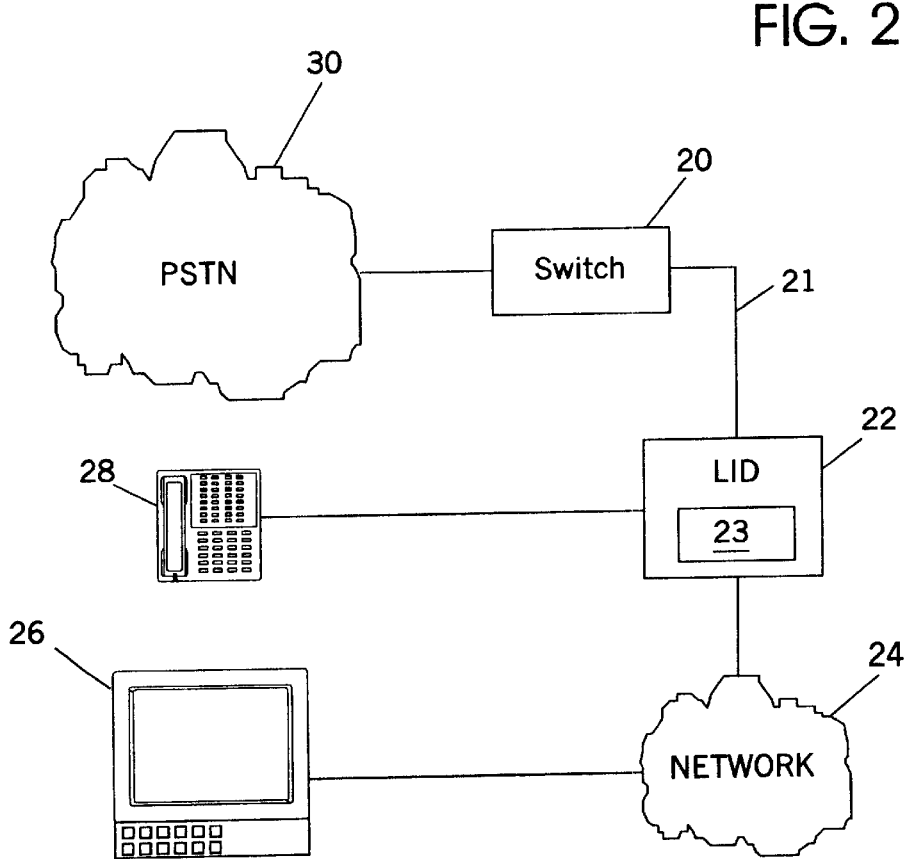
FIG. 2 is a block diagram illustrating components in a telephone network according to one embodiment of the present invention.

FIG. 2 illustrates a network according to one embodiment of the present invention. Telephone 28 is an analog telephone and has a 'companion' computer 26 associated therewith. By 'companion' it is meant that the user of telephone 28 has access to computer 26, for example telephone 28 and computer 26 may be on top of the same desk. Computer 26 can comprise a conventional desktop computer, such as a Windows or UNIX computer. Computer 26 preferably includes a monitor for communication with a user.

One advantage of ISDN service over analog POTS is that the functional messaging associated with ISDN provides significantly more call control information than the messaging associated with an analog telephone. To increase the call control information associated with telephone 28, according to the present invention analog telephone 28 is provisioned at switch 20 as an ISDN telephone. Provisioning refers to the process carried out by the local exchange carrier to define to the relevant telecommunications equipment, in this case switch 20, sufficient information to enable the switch to communicate with the provisioned equipment. Provisioning telephone 28 as an ISDN telephone causes switch 20 to generate and send to LID 22 ISDN Q.931 messages for telephone 28 during call processing. Switch 20 also expects Q.931 messages from LID 22 in response from telephone 28. To translate between analog POTS messages and Q.931 messages, LID 22 includes a translator 23. Translator 23 receives Q.931 messages from switch 20, and communicates, as necessary, the equivalent analog signals to telephone 28. Translator 23 also translates events generated by telephone 28 into the appropriate Q.931 messages and communicates them to switch 20 as necessary. The use of the phrase switch or central office as used herein includes any of a variety of systems such as a conventional class 5 telephone switch, a call server, a media gateway controller, or a call agent, for example.

LID 22 is coupled to a data network 24 which can comprise any suitable communications medium, such as a local area network and/or wide area network, or through any other suitable connection including an xDSL, EtherLoop or cable modem connection. Computer 26 is also coupled to data network 24 preferably via a conventional network connection such as described above. LID 22 communicates notification of Q.931 messages associated with telephone 28 and the occurrence of certain events at telephone 28, as described in greater detail herein, to computer 26 via data network 24. The communication could comprise the actual Q.931 message, or merely notification of receipt of a Q.931 message. The protocol used to communicate between LID 22 and computer 26 could comprise any suitable protocol for communicating the relevant information between the two devices. For example, the messages communicated between LID 22 and computer 26 could comprise the actual Q.931 messages received from switch 20 in a suitable format, such as via an Internet Protocol (IP) packet, or could comprise a SIP (Session Initiation Protocol) message, an H.323 message, or other suitable message. For the sake of illustration, the invention will be described herein as using Q.931 messaging, but it is apparent this is just one of many different protocols that could be used. Generally speaking, LID 22 maps the ISDN D-channel control messages onto the data network for transmission to computer 26 in one fashion or another. LID 22 can also receive Q.931 (or other suitable format) messages from computer 26 which it can send as a Q.931 message to switch 20, as described in greater detail herein.

Conventional attempts to integrate a computer and a telephone rely on a modem that utilizes analog DTMF signals. Such systems essentially emulate a CLASS telephone. One problem with such systems is that they are designed to detect analog signals that may vary, and thus may not be easily detectable, or may not occur at all. For example, such a conventional system must be able to detect certain events such as a ringback, to provide certain functionality. However, the ringback sound can differ depending upon the particular country. Thus, the system may work when processing a call in one country, but will not operate properly when processing a call in another country. Another problem can arise when unexpected signals are received. For example, it is becoming increasingly common to receive a voice message providing various options to a caller when the called number is busy. A conventional system that is expecting either ringback or a busy signal can not respond to this situation, and will likely report the line as being busy. In contrast, because the present invention utilizes digital messaging, appropriate action can be taken upon receipt of the message, regardless of the reason for the message.

The ability to send Q.931 call control messages to computer 26 allows tighter integration of telephone 28 and computer 26 than would otherwise be possible with conventional analog call control information. Unlike analog signaling, Q.931 messages have a predetermined format regardless of their origin. For example, during a call made from PSTN 30 to telephone 28, switch 20 generates a Q.931 SETUP message and sends it to LID 22. LID 22 sends the SETUP message to computer 26. A SETUP message typically includes the directory number of the calling party. Assuming that the user of computer 26 is a customer support representative, computer 26 can use the calling party directory number from the SETUP message to retrieve and display on the computer monitor relevant information associated with the caller, such as a history of problems reported by the caller. Alternately, computer 26 could use the calling party directory number to determine the name of the calling party and display the name of the caller on the computer monitor. The user can be given the opportunity to accept or reject the call. For example, computer 26 can display the name of the caller in a dialog box along with 'ACCEPT' and 'REJECT' buttons. If the user clicks on the 'ACCEPT' button, computer 26 can generate a Q.931 CONNECT message and send it to LID 22. LID 22 sends the CONNECT message to switch 20 which in turn interfaces with PSTN 30 to connect the call. If the user clicks on the 'REJECT' button, computer 26 can generate a Q.931 RELEASE message and send it to LID 22 to terminate the call.

LID 22 includes a memory that contains data indicating that telephone 28 and computer 26 are associated with one another. Such data can be created through a provisioning process and can be maintained in a suitable data structure in LID 22. This data can include an address for computer 26 so that LID 22 knows where to send Q.931 messages associated with telephone 28. Such an address can comprise, for example, an Internet Protocol (IP) address associated with computer 26. Similarly, computer 26 can contain an address, such as an IP address, for LID 22 so that computer 26 can send Q.931 messages to LID 22. An alternative to provisioning LID 22 with the IP address of computer 26 would be to allow for dynamic IP address discovery. Telephone 28 could be provisioned on LID 22 as subscribing to a special service that allows computer 26 to participate in the calling process. Computer 26 may have a USB message stack, or other suitable intelligence, that can communicate over the network with LID 22 so that LID 22 can determine the availability or unavailability for computer 26, as well as its IP address.

Alternatively, if the data network 24 is a communications path used by computer 26 for high speed data communications, such as an xDSL, EtherLoop or cable modem connection, LID 22 can obtain the IP address of computer 26 by virtue of the use of its IP address by computer 26 over the connection.

Figure 3:
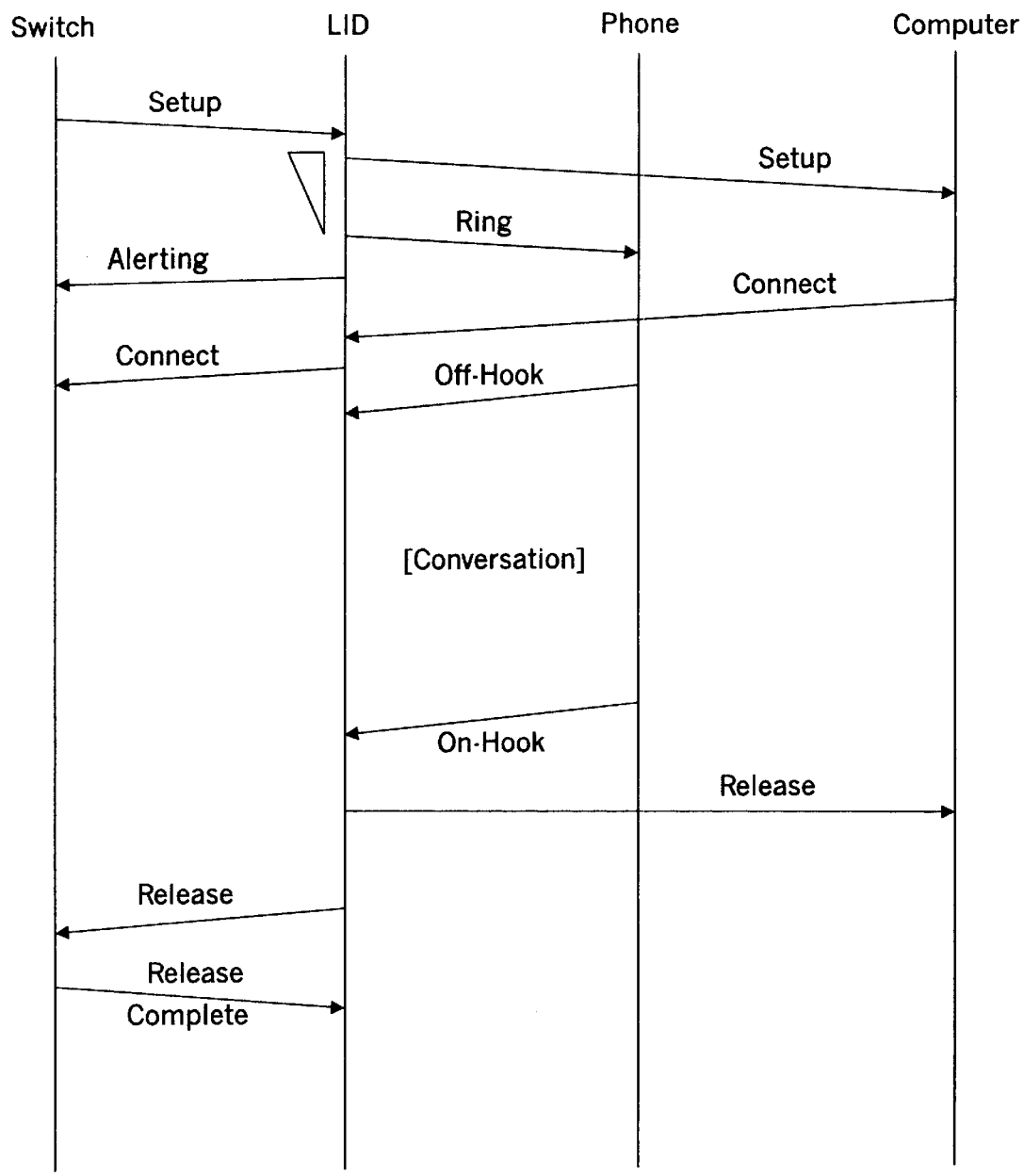
FIG. 3 is a message sequence diagram illustrating a flow of messages for answering a call with a computer according to one embodiment of the present invention.

FIG. 3 is a message sequence diagram illustrating a flow of messages according to one embodiment of this invention for answering with computer 26 a telephone call placed to telephone 28. For purposes of illustration, FIG. 3 will be discussed in conjunction with FIG. 2. Switch 20 receives from PSTN 30 a message indicating an incoming call for telephone 28. In response to this message, and because analog telephone 28 is provisioned as an ISDN telephone, switch 20 generates a SETUP message and sends the message to LID 22. LID 22 sends the SETUP message to computer 26 via network 24. A timer is set, giving computer 26 an opportunity to reject the call. LID 22 sends an ALERTING message to switch 20. A SETUP message typically includes the calling party directory number. Computer 26 extracts the calling party information, such as the directory number and/or calling party name, from the SETUP message and displays information associated with the caller on its associated monitor. Such information could comprise the name of the calling party, or merely the calling party directory number, or any other suitable information. Computer 26 can give the user the opportunity to accept or reject the call by clicking on an 'ACCEPT' or 'REJECT' button displayed on the monitor. Assuming the user accepts the call, computer 26 generates and sends to LID 22 a CONNECT message. LID 22 sends the CONNECT message to switch 20. The user can then take the telephone OFF-HOOK to start a conversation with the calling party. After LID 22 detects an ON-HOOK condition from telephone 28, indicating conversation termination, LID 22 can generate and send a RELEASE message to computer 26, informing computer 26 that the conversation has terminated. LID 22 also sends a RELEASE message to switch 20, which responds with a RELEASE COMPLETE message to LID 22 in accordance with standard Q.931 messaging. If no message is received from the computer before the timer expires, LID 22 can optionally cause telephone 28 to ring.

According to another embodiment of this invention, the OFF-HOOK and ON-HOOK messages are optional, and telephone 28 could remain in a constant OFF-HOOK state. For example, telephone 28 may be a speaker telephone or a telephone with a headset, and after the user ACCEPTS the call from computer 26, she can start talking into the telephone without having to physically manipulate the telephone. In this scenario, when the conversation terminates, the user would inform computer 26 by, for example, clicking on a 'TERMINATE' button, which would cause computer 26 to generate and send to LID 22 a RELEASE message.

If the user chose to REJECT the call, computer 26 can generate and send to LID 22 a RELEASE COMPLETE message, with a CAUSE of USER BUSY, or any other suitable indication. LID 22 sends this message to switch 20. In this event, the calling party will receive a busy signal.

Figure 4:
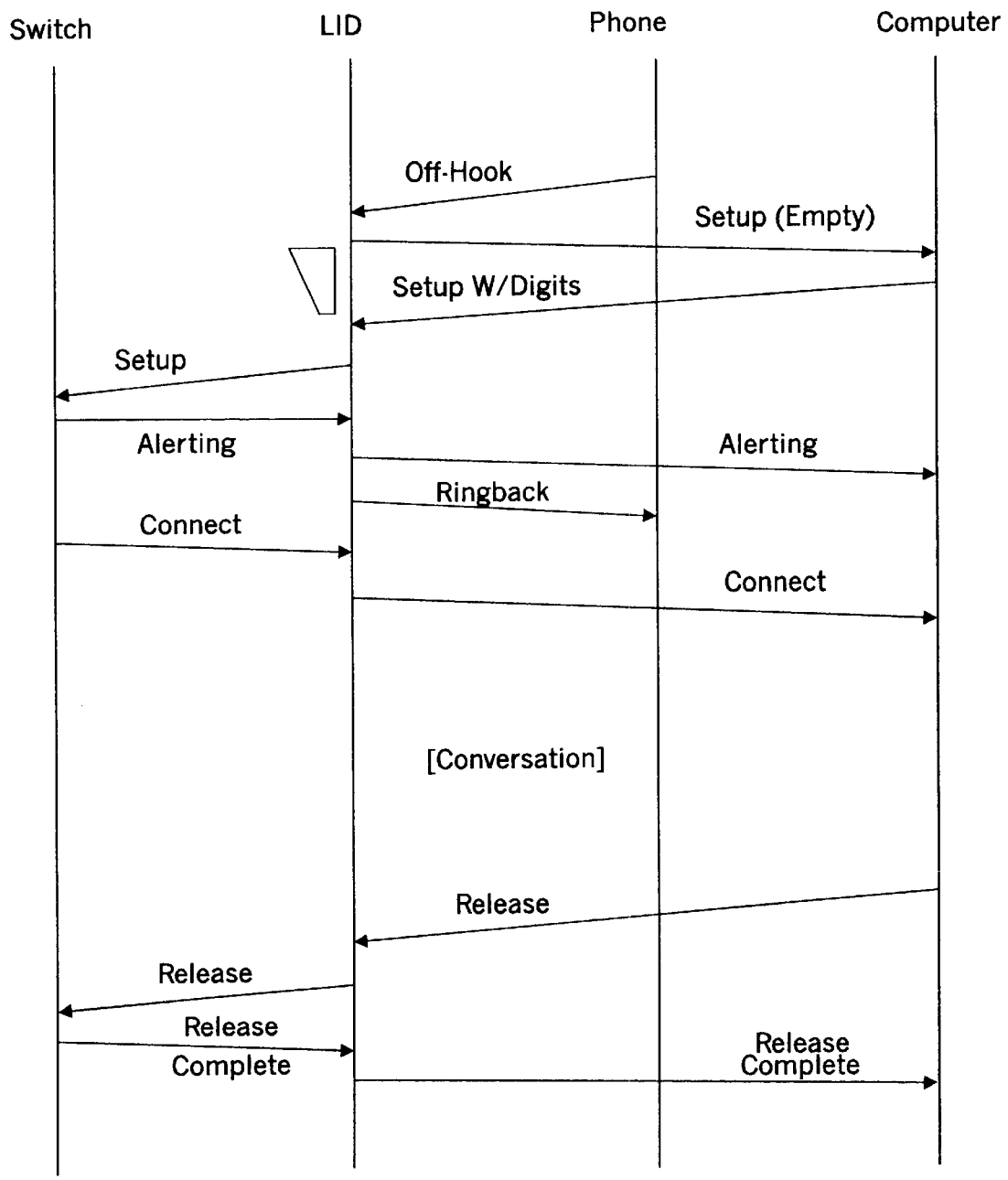
FIG. 4 is a message sequence diagram illustrating a flow of messages for placing a call with a computer according to one embodiment of the present invention.

FIG. 4 is a message sequence diagram illustrating a flow of messages according to one embodiment of this invention for initiating a call with computer 26. For purposes of illustration, FIG. 4 will be discussed in conjunction with FIG. 2. The user generates an OFF-HOOK condition at telephone 28 by, for example, picking up the telephone's handset. In response to this OFF-HOOK condition, LID 22 creates and sends to computer 26 a SETUP message with an empty called party number field. In response to this message, computer 26 can present to the user a list of telephone numbers. The user selects one of the displayed numbers, such as via a mouse pointer or keyboard. Computer 26 fills in the called party number field of the SETUP message with the selected number and sends it to LID 22. LID 22 sends the SETUP message to switch 20. Eventually switch 20 may respond with an ALERTING message indicating that the called party is being rung. LID 22 sends the ALERTING message to computer 26 and (if the phone is on hook) can provide a ring splash to telephone 28 to alert the user that the called party is being rung. Optionally, the ring splash can occur before the SETUP message is sent to switch 20 to ensure the user is willing to place the call before the call is initiated. Upon connection with the called party, switch 20 generates and sends a CONNECT message to LID 22, which in turn LID 22 sends to computer 26. A conversation can ensue. As discussed with regard to FIG. 3, the user can terminate the conversation by generating an ON-HOOK condition by physically hanging up the telephone, or by causing computer 26 to generate and send to LID 22 a RELEASE message such as by clicking on a 'HANGUP' button displayed on computer 26. LID 22 sends the RELEASE message to switch 20 which in turn responds to LID 22 with a RELEASE COMPLETE message. LID 22 sends the RELEASE COMPLETE message to computer 26.

Figure 5:
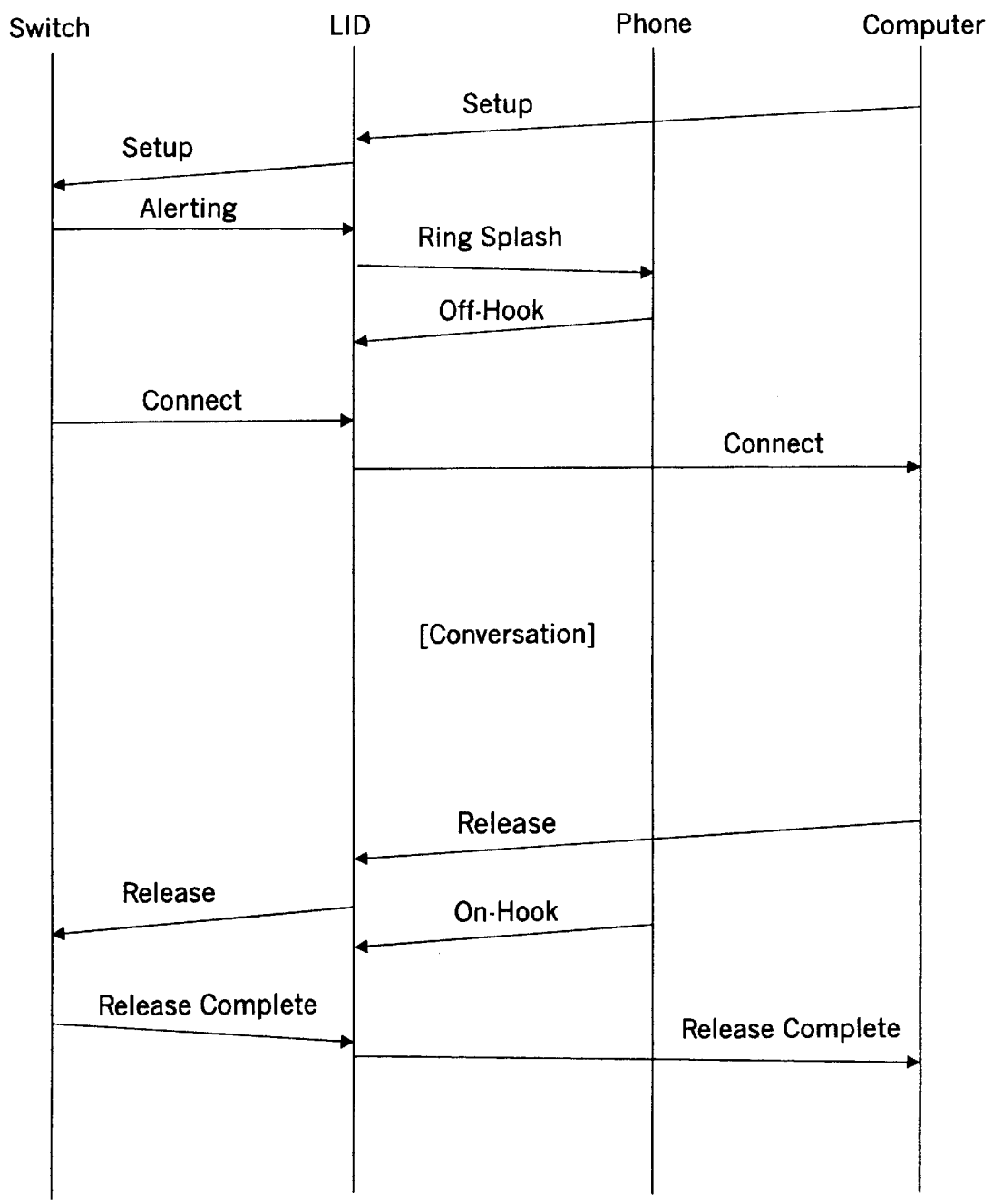
FIG. 5 is a message sequence diagram illustrating a flow of messages for computer-based name dialing according to one embodiment of the present invention.

FIG. 5 is a message sequence diagram illustrating a flow of messages according to one embodiment of this invention for initiating computer-based name dialing from computer 26. For purposes of illustration, FIG. 5 will be discussed in conjunction with FIG. 2. Computer 26 presents on its associated monitor a list of names for dialing. The user selects a particular name, and computer 26 obtains the directory number associated with the name. For example, computer 26 can have access to a directory that associates names with directory numbers. Computer 26 generates and sends a SETUP message with the appropriate directory number to LID 22, which in turns sends the SETUP message to switch 20. After the called party is rung, switch 20 responds with an ALERTING message. LID 22 can then respond with a ring splash (if the phone is on hook) to telephone 28 to notify the user to take the telephone off-hook. When the called-party causes its telephone to go off-hook, switch 20 sends LID 22 a CONNECT message, which LID 22 in turn sends to computer 26. A conversation can ensue. As discussed with regard to FIGS. 3 and 4, the user can terminate the call by hanging up the telephone or by indicating call termination to computer 26, which can then generate and send to LID 22 a RELEASE message. LID 22 sends the RELEASE message to switch 20, which in turn sends a RELEASE COMPLETE message to LID 22.

The foregoing description of preferred embodiments of the invention has been presented for purposes of illustration. It is not intended to be exhaustive or to limit the invention to the precise form disclosed. Obvious modifications or variations are possible in light of the above teachings. For example, although it has been discussed that Q.931 messages, such as SETUP and CONNECT messages, are communicated between LID 22 and computer 26, it is apparent that instead of using actual Q.931 messages, LID 22 and computer 26 could use any predetermined message format sufficient to carry the appropriate information. The embodiments were chosen and described in order to best illustrate the principals of the invention and its practical application to thereby enable one of ordinary skill in the art to best utilize the invention and various embodiments and with various modifications as are suited to the particular use contemplated. It is intended that the scope of the invention be defined by the claims appended hereto.

What is claimed is:

1. A method for communicating a call control message between a loop interface device and a computer, comprising:
   indicating to a switch associated with a telephone that the telephone communicates via an ISDN protocol, communications between the telephone and the switch being processed through a loop interface device;
   receiving at the loop interface device a first ISDN message transmitted by the switch, the first ISDN message being associated with the telephone; and
   sending notification of the first ISDN message to a computer associated with the telephone.

2. A method according to claim 1 wherein the telephone is a non-ISDN telephone.

3. A method according to claim 2 wherein the telephone is an analog telephone.

4. A method according to claim 1, wherein the first ISDN message comprises a message for initiating a call with the telephone, further comprising receiving a response from the computer, the response including a command to reject the call, and forwarding a second ISDN message to the switch to reject the call.

5. A method according to claim 4, wherein the computer generates the second ISDN message, and wherein the response from the computer comprises the second ISDN message.

6. A method according to claim 1, wherein the notification comprises the first ISDN message.

7. A method according to claim 1, wherein in response to the first ISDN message the computer outputs information to an output device.

8. A method according to claim 7, wherein in response to the first ISDN message the computer performs a predetermined action.

9. A method according to claim 1, wherein the loop interface device comprises a media gateway controller.

10. A method according to claim 1, wherein the loop interface device comprises a digital loop carrier.

11. A method for enhancing call control information associated with a non-ISDN telephone, comprising:

indicating to a switch that a non-ISDN telephone communicates in ISDN protocol;

receiving at a loop interface device an ISDN message sent by the switch to the non-ISDN telephone;

forwarding data associated with the ISDN message to a computer; and receiving at the loop interface device a message generated by the computer in response to the data forwarded to the computer.

12. A method according to claim 11, wherein the ISDN message is H.323 compliant.

13. A method comprising:

provisioning a subscriber line at a switch as an ISDN line;

coupling a loop interface device to the switch;

coupling the subscriber line to the loop interface device;

connecting an analog telephone to the subscriber line;

sending an ISDN message directed to the analog telephone from the switch to the loop interface device; and sending notification of the ISDN message to a computer coupled to the loop interface device.

14. A method according to claim 13, further comprising receiving a directive from the computer in response to the notification.

15. A method according to claim 13, further comprising ringing the analog telephone in response to the directive.

16. A method for communicating a call control message between a loop interface device and a computer, comprising:

indicating to a switch associated with a stimulus messaging device that the stimulus messaging device communicates via a functional messaging protocol, communications between the stimulus messaging device and the switch being processed through a loop interface device;

receiving at the loop interface device a first functional message transmitted by the switch, the first functional message being associated with the stimulus messaging device; and sending notification of the first functional message to a computer associated with the stimulus messaging device.

17. A method according to claim 16, wherein the functional messaging protocol comprises H.323.

18. A method according to claim 16, wherein the functional messaging protocol comprises SIP.

19. A method according to claim 16, wherein the stimulus messaging device comprises an analog telephone.

20. A method according to claim 16, wherein the stimulus messaging device ordinarily communicates via a stimulus messaging protocol selected from the group consisting of MGCP, H.248, and H.245.

21. A method according to claim 16, wherein the switch comprises one of a call server, a media gateway controller, and a call agent.

* * * * *